United States Patent
Wang et al.

(10) Patent No.: US 10,326,294 B2
(45) Date of Patent: Jun. 18, 2019

(54) SYSTEM AND METHOD FOR GREEN BATTERY CONDITIONING

(71) Applicant: Dell Products, LP, Round Rock, TX (US)

(72) Inventors: Lei Wang, Austin, TX (US); Sandor Farkas, Round Rock, TX (US)

(73) Assignee: Dell Products, LP, Round Rock, TX (US)

(*) Notice: Subject to any disclaimer, the term of this patent is extended or adjusted under 35 U.S.C. 154(b) by 96 days.

(21) Appl. No.: 14/802,495

(22) Filed: Jul. 17, 2015

(65) Prior Publication Data

US 2017/0018941 A1 Jan. 19, 2017

(51) Int. Cl.
*H02J 7/00* (2006.01)
*G06F 3/06* (2006.01)
*H02J 9/06* (2006.01)

(52) U.S. Cl.
CPC ............ *H02J 7/0068* (2013.01); *G06F 3/065* (2013.01); *G06F 3/0619* (2013.01); *G06F 3/0688* (2013.01); *G06F 3/0689* (2013.01); *H02J 9/061* (2013.01); *H02J 7/007* (2013.01)

(58) Field of Classification Search
None
See application file for complete search history.

(56) References Cited

U.S. PATENT DOCUMENTS

| 7,880,437 | B2 | 3/2011 | Wang et al. |
| 8,129,946 | B2 | 3/2012 | Wang et al. |
| 2009/0160402 | A1* | 6/2009 | Wang ............... H01M 10/4285 320/134 |
| 2009/0195211 | A1* | 8/2009 | Wang ............... G01R 31/3679 320/136 |
| 2010/0270975 | A1 | 10/2010 | Wong et al. |
| 2011/0276810 | A1* | 11/2011 | Chang ................. G06F 1/263 713/300 |
| 2012/0086276 | A1* | 4/2012 | Sawyers ................ H02J 1/12 307/66 |
| 2013/0339757 | A1* | 12/2013 | Reddy .................. G06F 1/3212 713/300 |
| 2014/0156209 | A1* | 6/2014 | Yuan .................. G01R 31/3606 702/63 |
| 2014/0298045 | A1 | 10/2014 | Sieber et al. |
| 2015/0022102 | A1* | 1/2015 | Holmes .............. H05B 33/0815 315/191 |

* cited by examiner

*Primary Examiner* — Mohammad Ali
*Assistant Examiner* — Vincent W Chang
(74) *Attorney, Agent, or Firm* — Larson Newman, LLP

(57) ABSTRACT

An information handling system includes an information handling subsystem, a power supply unit operably connected to the information handling subsystem, and a battery power subsystem operably connected to the information handling subsystem and having a controller. The controller configured to enter a learning mode of the battery power subsystem when the information handling subsystem is in a normal power state, enable a regulator output of a regulator of the battery power subsystem to provide power from a battery of the battery power subsystem at a learning mode current limit and at a learning mode voltage level to the information handling subsystem, provide, via the regulator output, power from the battery at a constant learning mode current level and at the learning mode voltage level to the information handling subsystem, and determine that the battery has been discharged to an acceptable discharge level.

19 Claims, 7 Drawing Sheets

_US 10,326,294 B2_

SYSTEM AND METHOD FOR GREEN BATTERY CONDITIONING

FIELD OF THE DISCLOSURE

This disclosure generally relates to information handling systems, and more particularly relates to a system and method for green battery conditioning in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

An information handling system can include a battery that provides temporary backup power in the event the primary power source for the information handling system is interrupted. Some battery types require a learning cycle or reconditioning cycle to be performed periodically. The learning cycle discharges and then charges the battery, measuring the change in voltage and the amount of charge in order to build a battery discharge curve. This operation allows the information handling system to better estimate the capacity of the battery. The chemistry of the battery may have a largely flat voltage versus charge curve, with the slope of the curve changing rapidly only at low charge levels. This characteristic of the battery may require the battery cells within a battery to be discharged to a low level in order to maintain the health of the battery.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
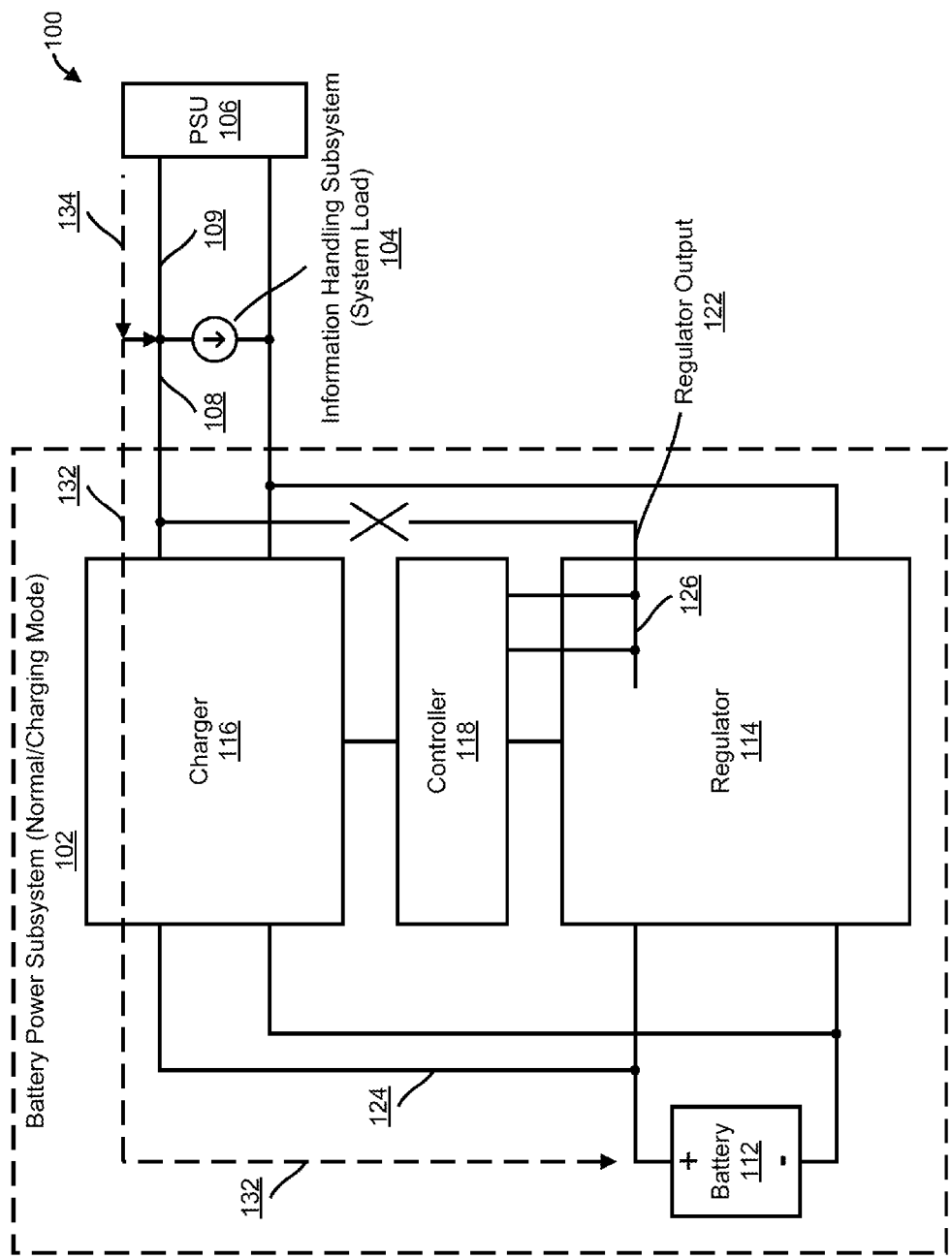
FIG. 1 is a block diagram illustrating an information handling system for green battery conditioning in a normal/charging mode of operation according to an embodiment of the present disclosure.
Figure 2:
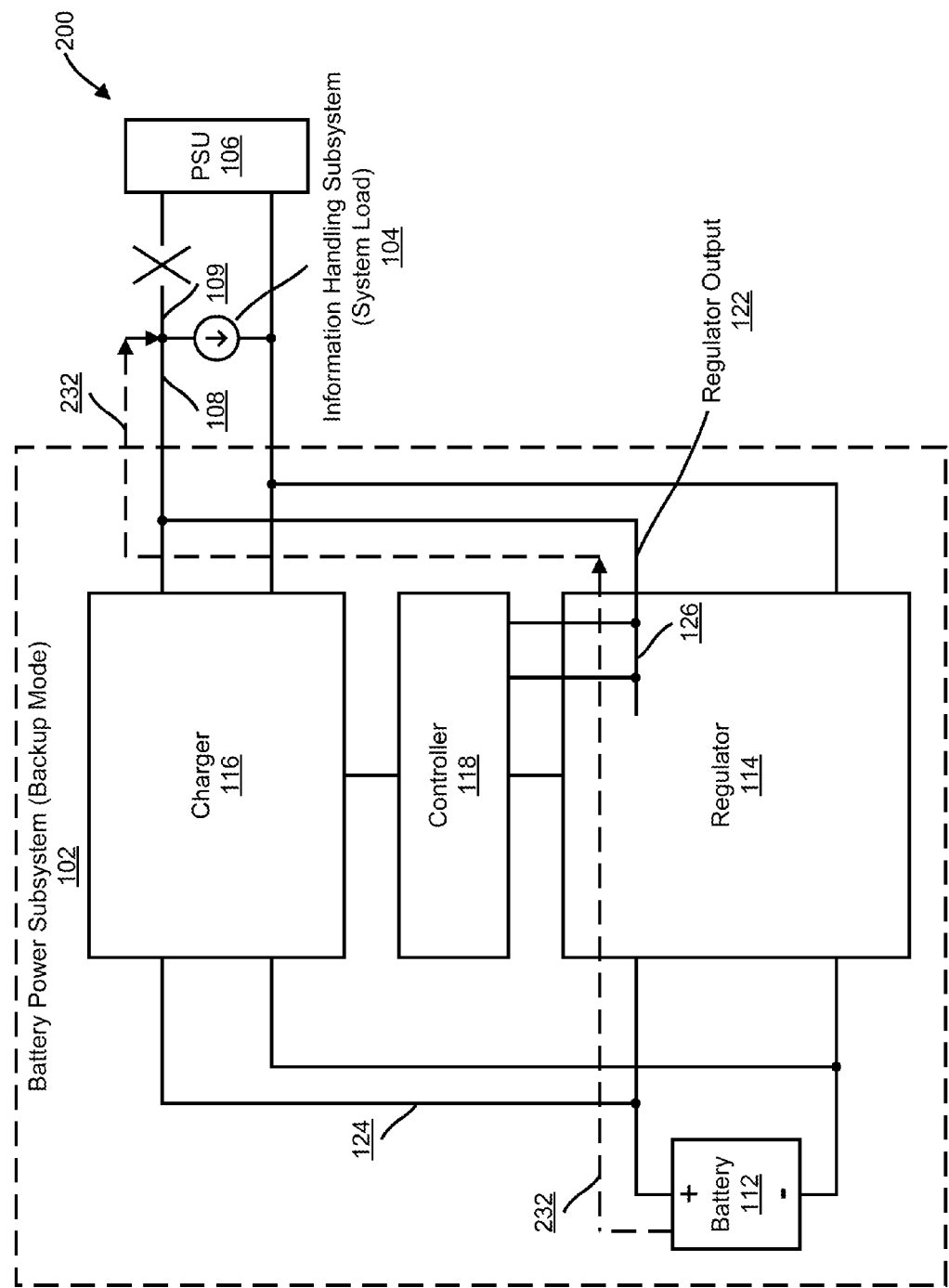
FIG. 2 is a block diagram illustrating the information handling system of FIG. 1 in a backup mode of operation according to an embodiment of the present disclosure.
Figure 3:
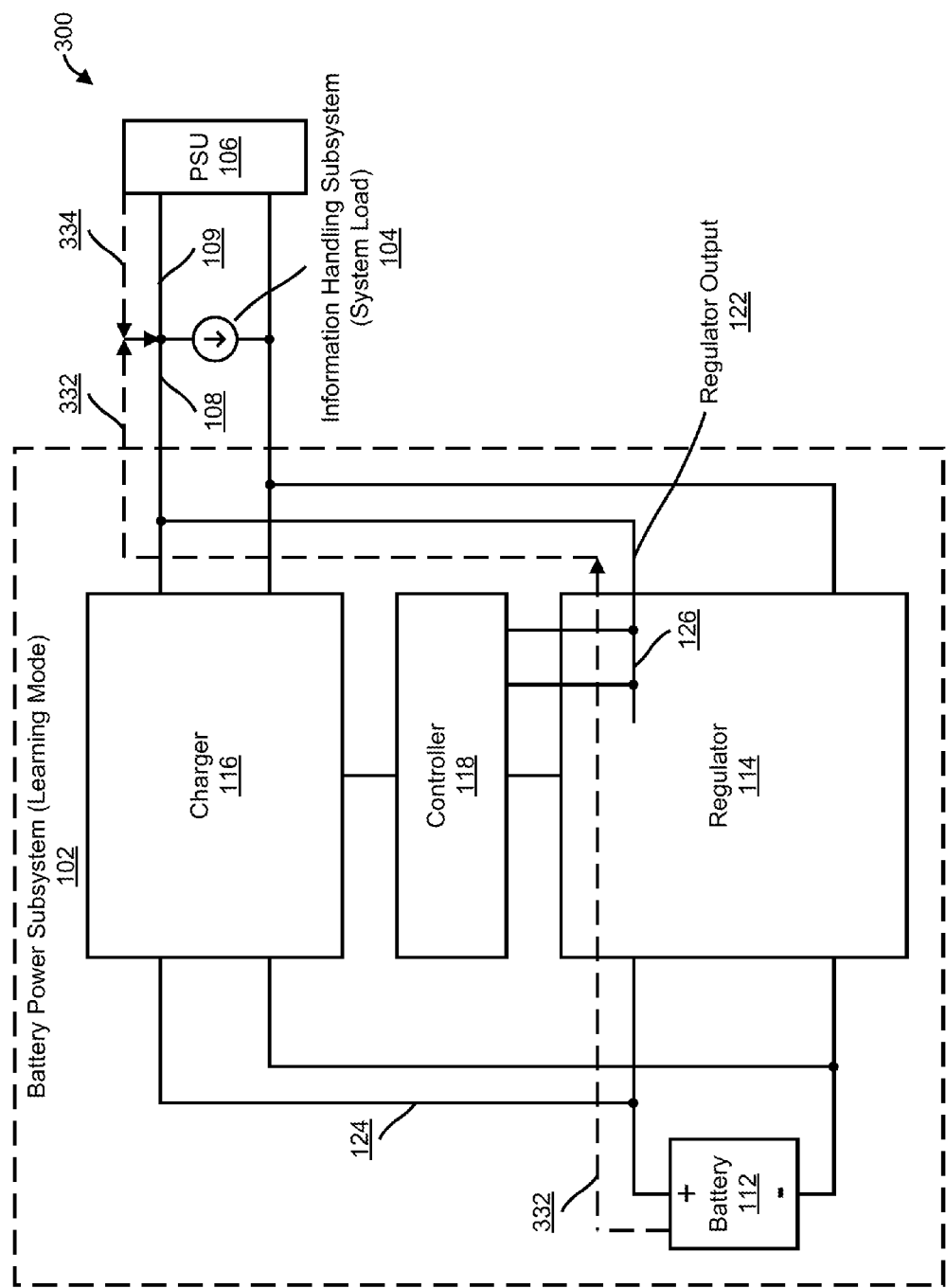
FIG. 3 is a block diagram illustrating the information handling system of FIG. 1 in a learning mode of operation according to an embodiment of the present disclosure.

FIGS. 1-3 illustrate an information handling system for green battery conditioning that includes a battery power subsystem that provides several modes of operation to allow a battery within the battery power subsystem to: provide temporary power to the information handling subsystem during a backup mode of operation in the event a primary power supply unit for the information handling system is interrupted, provide power to the information handling system during a learning mode of operation to discharge the battery, and receive power from the primary power supply unit during a normal or charging mode of operation to charge the battery, according to an embodiment of the present disclosure.

FIG. 1 shows an information handling system 100 for green battery conditioning in a normal or charging mode of operation. For the purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a Central Processing Unit (CPU), a Programmable Logic Array (PLA), an embedded device such as a System-On-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various Input and Output (I/O) devices, such as a keyboard, a mouse, and a video display.

Information handling system 100 includes battery power subsystem 102, information handling subsystem 104, and power supply unit 106 that communicate with each other via a communication interconnect. Battery power subsystem 102 provides power to information handling subsystem 104 via power interconnect 108. Power supply unit 106 provides power to information handling subsystem 104 via power interconnect 109. Power supply unit 106 provides power to battery power subsystem 102 via power interconnects 108 and 109, where power interconnect 108 is connected to power interconnect 109. Battery power subsystem 102 has a charging mode of operation, a backup mode of operation, and a learning mode of operation, described in further detail below. Information handling subsystem 104 has a normal power state, and a power loss state, described below in further detail, and operates at an information handling subsystem voltage level. Power supply unit 106 is operable to provide power at an information handling subsystem voltage level, where the information handling subsystem voltage level may be 12 volts, 3.3 volts, 2.8 volts, or some other voltage level needed to supply information handling subsystem 104.

Battery power subsystem 102 includes battery 112, regulator 114 having regulator output 122, charger 116, and controller 118 that communicate with each other via a controller interconnect. Regulator 114 receives power from battery 112 via power interconnect 124 and provides power to information handling subsystem 104 via regulator output 122 and power interconnect 108. Controller 118 monitors the current out of regulator output 122 via current feedback loop 126 of controller 118 to provide control loop functionality. Battery 112 provides power to regulator 114 at a battery voltage level and regulator 114 provides power to information handling subsystem 104 at the information handling subsystem voltage level, where the battery voltage level may be 12 volts, 6 volts, or another voltage level of a specific battery. Regulator 114 is operable to step down the battery voltage level to the information handling subsystem voltage level when the battery voltage level is greater than the information handling subsystem voltage level. Regulator 114 is further operable to step up the battery voltage level to the information handling subsystem voltage level when the battery voltage level is less than the information handling subsystem voltage level. Regulator 114 may be a buck regulator that is operable to step down the battery voltage level, a boost regulator that is operable to step up the battery voltage, a combination buck/boost regulator that is operable to step up and step down the battery voltage as appropriate, and the like. Charger 116 receives power from power supply unit 106 via power interconnects 108 and 109 and provides power to battery 112 via power interconnect 124. Similar to regulator 114, charger 116 is operable to step down the information handling subsystem voltage level to the battery voltage level when the information handling subsystem voltage level is greater than the battery voltage level and to step up the information handling subsystem voltage level to the battery voltage level when the information handling subsystem voltage level is less than the battery voltage level.

Battery power subsystem 102 is operable to determine that information handling subsystem 104 is running in the normal power state and, in response, to enter the normal and charging mode of operation of battery power subsystem 102. Battery power subsystem 102 may determine that information handling subsystem 104 is running in the normal power state by receiving commands from information handling subsystem 104 through a power management bus (PMbus) protocol or other protocols. When battery power subsystem 102 enters the charging mode of operation, battery power subsystem 102 operates to disable regulator output 122 of regulator 114 and to enable charger 116 to receive power from power supply unit 106 to charge battery 112. During the charging mode of operation of battery power subsystem 102, battery 112 receives power, via charger 116, from power supply unit 106 to charge battery 112. Battery 112 may be charging, trickle charging, or idle at this time. When information handling subsystem 104 is in the normal power state, power supply unit 106 provides power to information handling subsystem 104 as illustrated by the dashed arrow that indicates the direction of current flow 134, and to battery power subsystem 102 as illustrated by the dashed arrow that indicates the direction of current flow 132. As illustrated, the dashed arrow further indicates the direction of current flow 132 to battery 112 via charger 116. The X illustrated at regulator output 122 indicates that regulator output 122 is disabled.

FIG. 2 shows the information handling system of FIG. 1 in the backup mode of operation. Battery power subsystem 102 is further operable to provide temporary power to information handling subsystem 104 during the backup mode of operation in the event that power supply unit 106 for information handling subsystem 104 is interrupted.

Information handling subsystem 104 may be a server having nonvolatile data storage, such as a Power Edge Raid Controller (PERC) and a Non-Volatile Dual Inline Memory Module (NVDIMM). In the event that information handling system 104 enters a power loss state due to a interruption of power from power supply unit 106, information handling system 104 may require power to be supplied from battery 112 for the time required to perform a backup event of information handling system 104. For example, the backup event needs power to be supplied from battery 112 for the time required for information handling system 104 to backup its data to the nonvolatile data storage and perform a system shutdown to prevent the loss of this data. A backup charge level of battery 112 needs to be maintained to support the backup event that may occur at any moment. The interruption of power may be due to a loss of AC power from power supply unit 106, degradation or loss of power from power supply unit 106 during a power brown out, and the like. In another embodiment, information handling system 104 may need an uninterruptable power supply that allows battery 112 to supply power to information handling system 104 during a power loss state until power from power supply unit 106 is restored.

Battery power subsystem 102 is further operable to determine that information handling subsystem 104 is running in the power loss state and, in response, to enter the backup mode of operation of battery power subsystem 102. Battery power subsystem 102 may determine that information handling subsystem 104 is in the power loss state by receiving commands from information handling subsystem 104, monitoring an AC power signal, or monitoring information handling subsystem 104 voltage level.

When battery power subsystem 102 enters the backup mode of operation, battery power subsystem 102 operates to enable regulator output 122 of regulator 114 to provide power from battery 112 to information handling subsystem

104, but not exceeding a backup mode current limit, once the current starts to go above the backup mode current limit, battery power subsystem 102 will start to droop a backup mode voltage level of regulator output 122 to maintain the current at the backup mode current limit level, where the backup mode voltage level is the same as the information handling subsystem voltage level. The backup mode current limit may be set to a maximum operating current limit of battery 112, for example, 10 amps. The power and the current from battery 112 depends on a system load of information handling subsystem 104 and the current may be any value from 0 amps to the backup mode current limit.

During the backup mode of operation of battery power subsystem 102, battery power subsystem 102 provides power, via regulator output 122, from battery 112 to information handling subsystem 104. Battery 112 is discharged at or lower than the rate of the backup mode current limit of battery 112. When information handling subsystem 104 is in the power loss state, battery 112 provides power to regulator 114 as illustrated by the dashed arrow that indicates the direction of current flow 232. As illustrated, the dashed arrow further indicates the direction of current flow 232 to information handling subsystem 104 from regulator 114 via regulator output 122. The X illustrated at power interconnect 109 indicates that power supply unit 106 is not providing power to information handling subsystem 104.

FIG. 3 shows the information handling system of FIG. 1 in the learning mode of operation. Battery power subsystem 102 is further operable to provide power to information handling subsystem 104 during a learning mode of operation to perform a learning cycle of battery 112.

Battery power subsystem 102 is further operable to determine that information handling subsystem 104 is running in the normal power state and that battery power subsystem 102 needs to perform the learning cycle of battery 112 and, in response, to enter the learning mode of operation of battery power subsystem 102. Battery power subsystem 102 may determine that information handling subsystem 104 is running in the normal power state by receiving system commands, described above. When battery power subsystem 102 enters the learning mode of operation, battery power subsystem 102 operates to enable regulator output 122 of a regulator 114 to provide power from battery 112 at a learning mode current limit and at a learning mode voltage level to information handling subsystem 104. This allows battery 112 to provide a constant current at regulator output 122. During the learning mode of operation of battery power subsystem 102, battery power subsystem 102 provides power, via regulator output 122, from battery 112 at the learning mode current limit and at the learning mode voltage level to information handling subsystem 104 to discharge battery 112, where regulator 114 provides constant current at the constant learning mode current limit, via regulator output 122, to information handling subsystem 104. The learning mode voltage level is set to slightly above the information handling subsystem voltage level, for example, 12.1 volts when the information handling subsystem voltage level is 12 volts, where the learning mode voltage level is based on current feedback loop 126 of controller 118 in battery 112, when the current goes above the learning mode current limit, controller 118 will droop down the voltage at regulator output 122 to decrease the current down to the learning mode current limit; when the current goes below the learning mode current limit, controller 118 will increase the voltage at regulator output 122 to increase the current to the learning mode current limit. The learning mode current limit may be less than the backup mode current limit utilized during the backup mode of operation of battery power subsystem 102, for example, 5 amps as compared to the backup mode current limit of 10 amps. Power supply unit 106 will naturally have lower power output by the same amount of power that is provided by battery power subsystem 102 based on the regulation by regulator 114. As such, no specific control of power supply unit 106 is needed.

Battery 112 is discharged at the rate of the learning mode current limit of battery 112. Battery power subsystem 102 further operates to monitor the level of charge of battery 112 to determine that battery 112 has been discharged to an acceptable discharge level and, in response, to recharge battery 112 to complete the learning cycle of battery 112. The discharge depth/level may be greater than or equal to 30% of the capacity of battery 112 to support information handling subsystem 104 performing the backup event. Battery power subsystem 102 may recharge battery 112 by entering the charging mode of operation of battery power subsystem 102 as described above.

When information handling subsystem 104 is in the normal power state and battery power subsystem 102 is in the learning mode of operation, power supply unit 106 provides power to information handling subsystem 104 as illustrated by the dashed arrow that indicates the direction of current flow 334. Battery 112 provides power to regulator 114 as illustrated by the dashed arrow that indicates the direction of current flow 332. As illustrated, the dashed arrow further indicates the direction of current flow 334 to information handling subsystem 104 from regulator 114 via regulator output 122. Battery 112 may further include a shunt to provide isolation between the regulator output 122 of regulator 114 and power interconnect 108, which also provides a current sense function inside battery power subsystem 102.

In solutions known in the prior art, training discharge circuitry utilized a dedicated switching component coupled to a resistive component within a battery to discharge the battery, which produces heat during the discharge of the battery, wastes power, and can impact the battery health including battery performance and life of the battery. By utilizing information handling subsystem 104 to discharge battery 112 during the learning mode operation of battery power subsystem 102, information handling subsystem 104 performs useful work. Cost is also reduced by eliminating the need for discharge resistors, a heat sink and reducing printed circuit board space required for battery circuitry. In addition, a heat source is removed from battery 112, system power efficiency is increased and improved, and the time to perform the learning cycle of battery 112 is reduced by allowing higher battery discharge rates as the discharge of battery 112 is not limited by heat dissipation of the discharge resistors.

Figure 4:
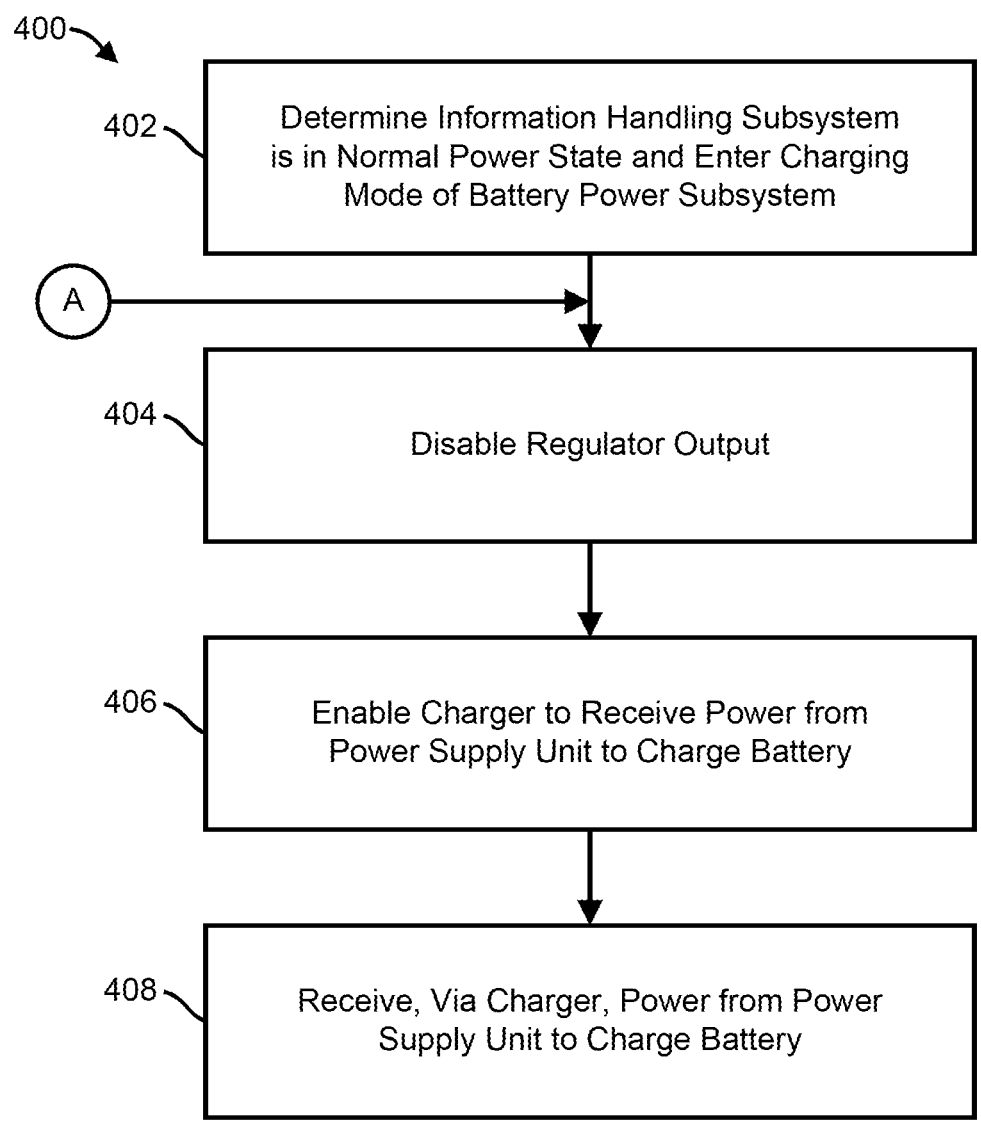
FIG. 4 illustrates a method for the information handling system of FIG. 1 entering a charging mode of operation according to an embodiment of the present disclosure.

FIG. 4 illustrates a method 400 for an information handling system, such as information handling system 100 of FIG. 1, to enter a charging mode of operation. Method 400 begins at block 402 where battery power subsystem 102 determines that information handling subsystem 104 is running in a normal power state and, in response, enters the charging mode of operation of battery power subsystem 102. At block 404, battery power subsystem 102 disables regulator output 122 of a regulator 114. At block 406, battery power subsystem 102 enables charger 116 to receive power from power supply unit 106 to charge battery 112. At block 408, battery 112 receives power, via charger 116, from power supply unit 106 to charge battery 112.

Figure 5:
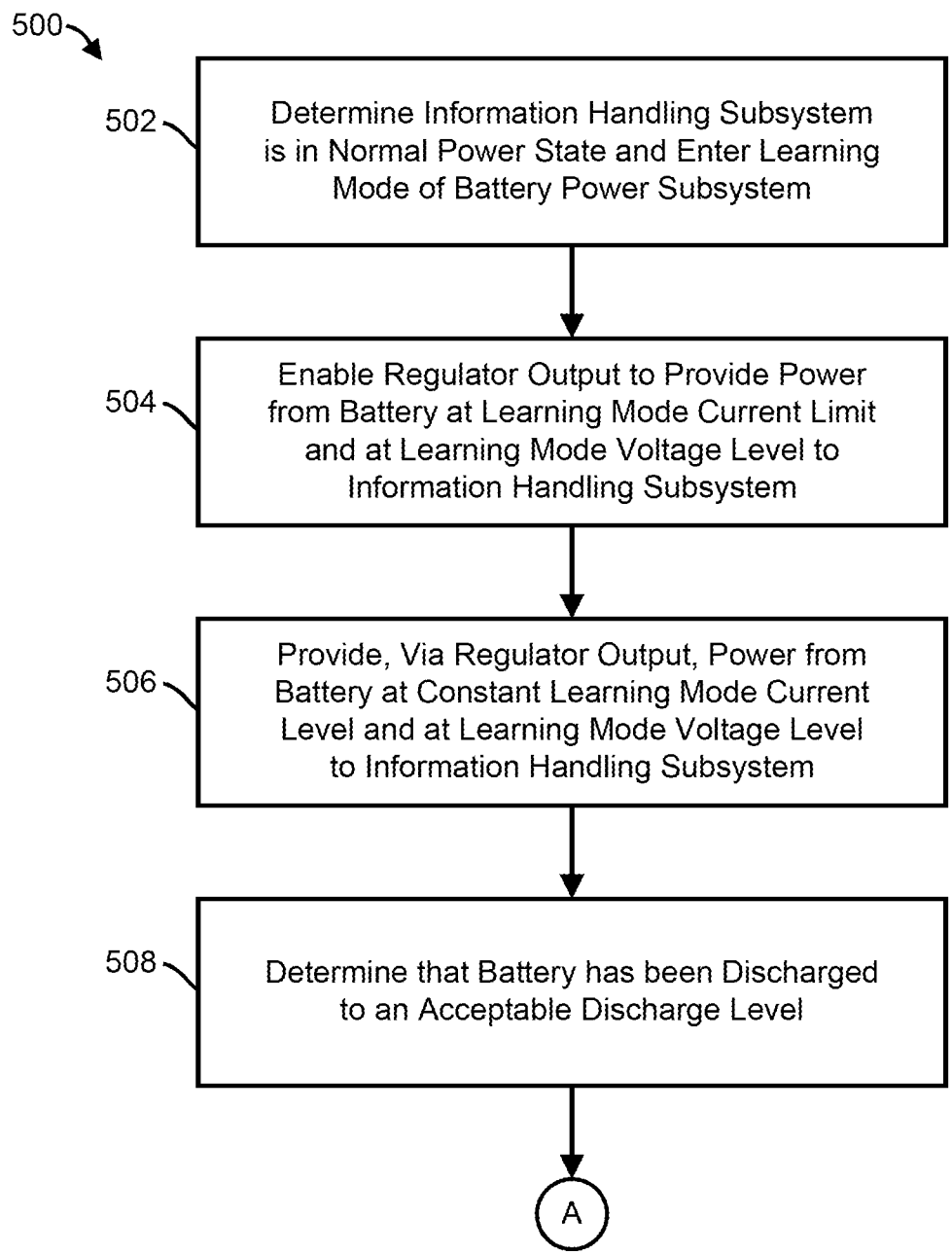
FIG. 5 illustrates a method for the information handling system of FIG. 1 entering a learning mode of operation according to an embodiment of the present disclosure.

FIG. 5 illustrates a method 500 for an information handling system, such as information handling system 100 of FIG. 1, to enter a learning mode of operation. Method 500 begins at block 502 where battery power subsystem 102 determines that information handling subsystem 104 is running in a normal power state and, in response, enters the learning mode of operation of battery power subsystem 102.

At block 504, battery power subsystem 102 enables regulator output 122 of a regulator 114 to provide power from battery 112 at a learning mode current limit and at a learning mode voltage level to information handling subsystem 104. At block 506, battery power subsystem 102 provides power, via regulator output 122, from battery 112 at the learning mode current limit and at the learning mode voltage level to information handling subsystem 104. At block 508, battery power subsystem 102 determines that battery 112 has been discharged to an acceptable discharge level.

Figure 6:
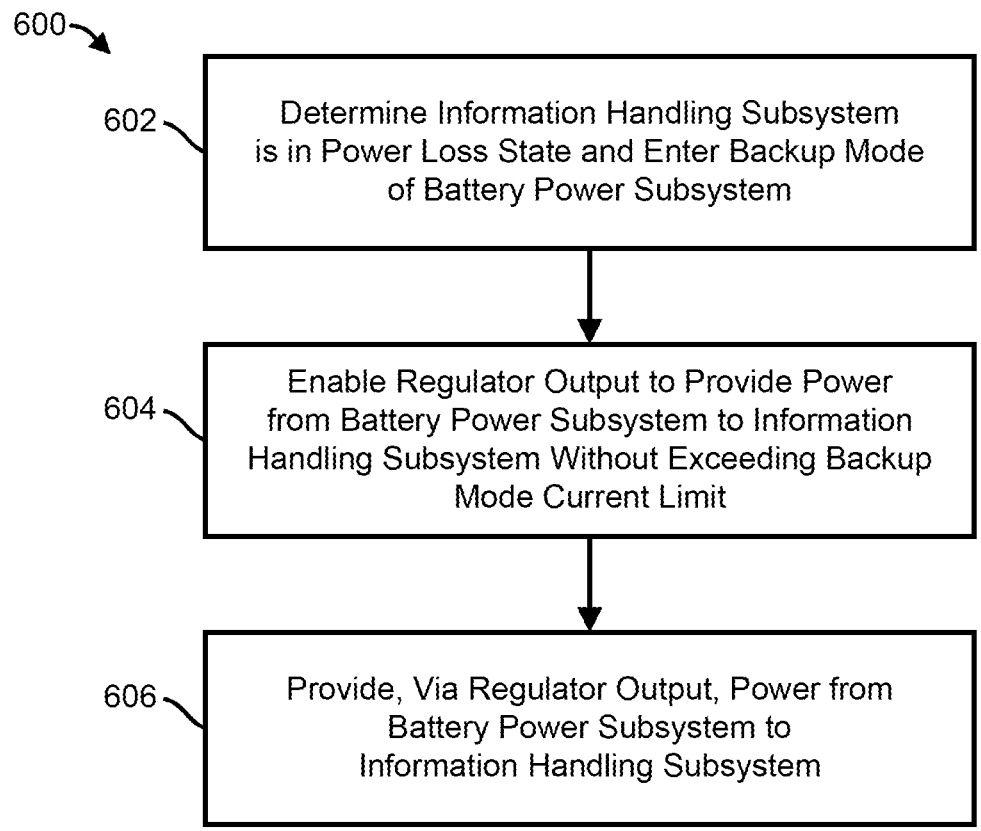
FIG. 6 illustrates a method for the information handling system of FIG. 1 entering a backup mode of operation according to an embodiment of the present disclosure.

FIG. 6 illustrates a method 600 for an information handling system, such as information handling system 100 of FIG. 1, to enter a backup mode of operation. Method 600 begins at block 602 where battery power subsystem 102 determines that information handling subsystem 104 is running in a power loss state and, in response, enters the backup mode of operation of battery power subsystem 102.

At block 604, battery power subsystem 102 enables regulator output 122 of a regulator 114 to provide power from battery 112 to information handling subsystem 104, but not exceeding a backup mode current limit. At block 506, battery power subsystem 102 provides power, via regulator output 122, from battery 112 to information handling subsystem 104.

Figure 7:
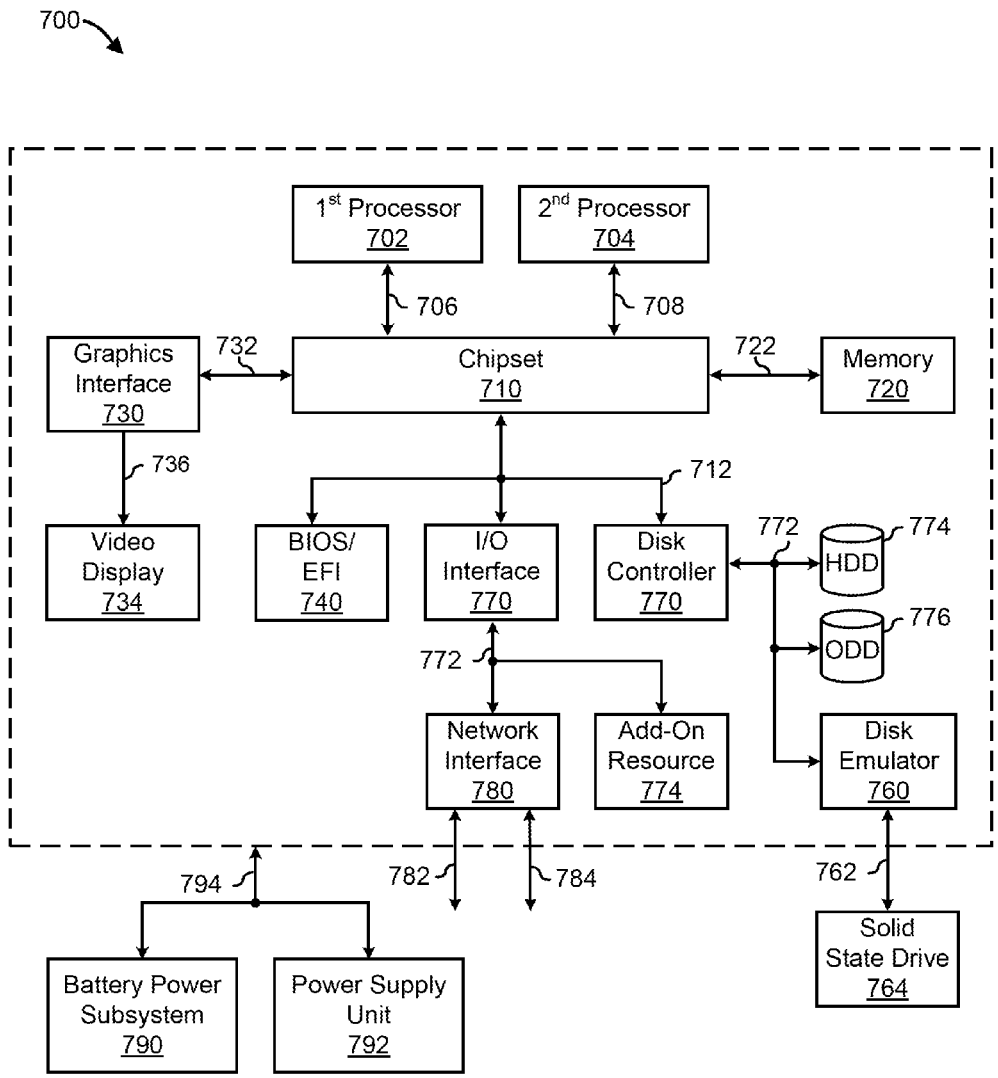
FIG. 7 is a block diagram illustrating a generalized information handling system according to an embodiment of the present disclosure.

FIG. 7 illustrates a generalized embodiment of information handling system 700. For purpose of this disclosure information handling system 700 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 700 can include processing resources for executing machine-executable code, such as a Central Processing Unit (CPU), a Programmable Logic Array (PLA), an embedded device such as a System-On-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various Input and Output (I/O) devices, such as a keyboard, a mouse, and a video display. Information handling system 700 can also include one or more buses operable to transmit information between the various hardware components.

Information handling system 700 can include devices or modules that embody one or more of the devices or modules described above, and operates to perform one or more of the methods described above. Information handling system 700 includes processors 702 and 704, a chipset 710, a memory 720, a graphics interface 730, include a Basic Input Output System/Extensible Firmware Interface (BIOS/EFI) module 740, a disk controller 750, a disk emulator 760, an Input/Output (I/O) interface 770, a network interface 780, a battery power subsystem 790, and a power supply unit 792. Battery power subsystem 790 is connected to the devices of information handling system 700 via power interconnect 794 and provides power to the devices of information handling system 700 as described in detail above. Power supply unit 792 is connected to the devices of information handling system 700 and battery power subsystem via power interconnect 794 and provides power to the devices of information handling system 700 and battery power subsystem 790 as previously described. Processor 702 is connected to chipset 710 via processor interface 706, and processor 704 is connected to the chipset via processor interface 708. Memory 720 is connected to chipset 710 via a memory bus 722. Graphics interface 730 is connected to chipset 710 via a graphics interface 732, and provides a video display output 736 to a video display 734. In a particular embodiment, information handling system 700 includes separate memories that are dedicated to each of processors 702 and 704 via separate memory interfaces. An example of memory 720 includes Random Access Memory (RAM) such as Static RAM (SRAM), Dynamic RAM (DRAM), Non-Volatile RAM (NV-RAM), or the like, Read Only Memory (ROM), another type of memory, or a combination thereof.

BIOS/EFI module 740, disk controller 750, and I/O interface 770 are connected to chipset 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 710 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 740 includes BIOS/EFI code operable to detect resources within information handling system 700, to provide drivers for the resources, initialize the resources, and access the resources. BIOS/EFI module 740 includes code that operates to detect resources within information handling system 700, to provide drivers for the resources, to initialize the resources, and to access the resources.

Disk controller 750 includes a disk interface 752 that connects the disc controller to a Hard Disk Drive (HDD) 754, to an Optical Disk Drive (ODD) 756, and to disk emulator 760. An example of disk interface 752 includes an Integrated Drive Electronics (IDE) interface, an Advanced Technology Attachment (ATA) such as a Parallel ATA (PATA) interface or a Serial ATA (SATA) interface, a SCSI interface, a USB interface, a proprietary interface, or a combination thereof. Disk emulator 760 permits a solid-state drive 764 to be connected to information handling system 700 via an external interface 762. An example of external interface 762 includes a USB interface, an IEEE 1394 (Firewire) interface, a proprietary interface, or a combination thereof. Alternatively, solid-state drive 764 can be disposed within information handling system 700.

I/O interface 770 includes a peripheral interface 772 that connects the I/O interface to an add-on resource 774 and to network interface 780. Peripheral interface 772 can be the same type of interface as I/O channel 712, or can be a different type of interface. As such, I/O interface 770 extends the capacity of I/O channel 712 when peripheral interface 772 and the I/O channel are of the same type, and the I/O interface translates information from a format suitable to the I/O channel to a format suitable to the peripheral channel 772 when they are of a different type. Add-on resource 774 can include a data storage system, an additional graphics interface, a Network Interface Card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as chipset 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   determining, by a controller of a battery power subsystem, whether an information handling subsystem is in a normal power state;
   entering, by the controller of the battery power subsystem, a learning mode of the battery power subsystem in response to the determination that the information handling subsystem is in the normal power state, wherein a power supply unit provides power to the information handling subsystem in the learning mode and the learning mode builds a battery discharge curve of a battery of the battery power subsystem;
   setting a learning mode current limit and a learning mode voltage level;
   enabling a regulator output of a regulator of the battery power subsystem to provide power from the battery of the battery power subsystem at the learning mode current limit and at the learning mode voltage level to the information handling subsystem while the battery power subsystem is in the learning mode;
   providing, via the regulator output, power from the battery at the learning mode current limit and at the learning mode voltage level to the information handling subsystem while the power supply unit provides power to the information handling subsystem in the learning mode, wherein an amount of power provided from the power supply unit to the information handling subsystem is reduced by the amount of power provided from the battery based on the learning mode current limit and the learning mode voltage level, wherein the battery provides power to the information handling subsystem concurrently with the power supply unit in the learning mode; and
   determining that the battery has been discharged to an acceptable discharge level.

2. The method of claim 1, further comprising:
   in response to determining that the battery has been discharged to the acceptable discharge level, entering a charging mode of the battery power subsystem.

3. The method of claim 1, wherein the acceptable discharge level of the battery is greater than a backup charge level of the battery that is required to support a backup event of the information handling subsystem.

4. The method of claim 1, wherein the regulator is a buck regulator to step down a battery voltage level to an information handling subsystem voltage level when the battery voltage level is greater than the information handling subsystem voltage level.

5. The method of claim 1, wherein the regulator is a boost regulator to step up a battery voltage level to an information handling subsystem voltage level when the battery voltage level is less than the information handling subsystem voltage level.

6. The method of claim 2, wherein entering the charging mode of the battery power subsystem further comprises:
   disabling the regulator output of the regulator;
   enabling a charger of the battery power subsystem to receive power from the power supply unit to charge the battery; and
   receiving, via the charger, power from the power supply unit to charge the battery.

7. The method of claim 1, further comprising:
   determining that the information handling subsystem is in a power loss state;
   entering a backup mode of the battery power subsystem;
   enabling the regulator output to provide power from the battery to the information handling subsystem without exceeding a backup mode current limit; and
   providing, via the regulator output, power from the battery to the information handling subsystem.

8. The method of claim 7, wherein a backup mode voltage level is equal to an information handling subsystem voltage level.

9. The method of claim 1, wherein the learning mode current limit is less than a backup mode current limit.

10. The method of claim 1, wherein the learning mode voltage level is greater than an information handling subsystem voltage level.

11. The method of claim 1, wherein the information handling subsystem is one or more of a Redundant Array of Independent Disks (RAID) system, a server, an Uninterruptible Power Supply (UPS) system, and a Non-Volatile Dual Inline Memory Module system.

12. An information handling system, comprising:
an information handling subsystem;
a power supply unit operably connected to the information handling subsystem; and
a battery power subsystem operably connected to the information handling subsystem and having a controller, the controller configured to:
determine whether the information handling subsystem is in a normal power state;
enter a learning mode of the battery power subsystem when the information handling subsystem is in the normal power state, wherein the power supply unit provides power to the information handling subsystem in the learning mode and the learning mode builds a battery discharge curve of a battery of the battery power subsystem;
set a learning mode current limit and a learning mode voltage level to discharge the battery,
enable a regulator output of a regulator of the battery power subsystem to provide power from the battery of the battery power subsystem at the learning mode current limit and at the learning mode voltage level to the information handling subsystem while the battery power subsystem is in the learning mode;
provide, via the regulator output, power from the battery at the learning mode current limit and at the learning mode voltage level to the information handling subsystem while the power supply unit provides power to the information handling subsystem in the learning mode, wherein an amount of power provided from the power supply unit to the information handling subsystem is reduced by the amount of power provided from the battery based on the learning mode current limit and the learning mode voltage level, wherein the battery provides power to the information handling subsystem concurrently with the power supply unit in the learning mode; and
determine that the battery has been discharged to an acceptable discharge level.

13. The information handling system of claim 12, further comprising:
in response to the determination that the battery has been discharged to the acceptable discharge level, enter a charging mode of the battery power subsystem.

14. The information handling system of claim 12, wherein the acceptable discharge level of the battery is greater than a backup charge level of the battery that is required to support a backup event of the information handling subsystem.

15. The information handling system of claim 12, wherein the regulator is a buck regulator to step down a battery voltage level to an information handling subsystem voltage level when the battery voltage level is greater than the information handling subsystem voltage level.

16. The information handling system of claim 12, wherein the regulator is a boost regulator to step up a battery voltage level to an information handling subsystem voltage level when the battery voltage level is less than the information handling subsystem voltage level.

17. The information handling system of claim 12, wherein the learning mode voltage level is greater than an information handling subsystem voltage level.

18. A non-transitory computer-readable medium including code for performing a method, the method comprising:
determining whether an information handling subsystem is in a normal power state;
entering a learning mode of a battery power subsystem when the information handling subsystem is in the normal power state, wherein a power supply unit provides power to the information handling subsystem in the learning mode and the learning mode builds a battery discharge curve of a battery of the battery power subsystem;
setting a learning mode current limit and a learning mode voltage level to discharge the battery;
enabling a regulator output of a regulator of the battery power subsystem to provide power from the battery of the battery power subsystem at the learning mode current limit and at the learning mode voltage level to the information handling subsystem while the battery power subsystem is in the learning mode;
providing power from the battery at the learning mode current limit and at the learning mode voltage level to the information handling subsystem while the power supply unit provides power to the information handling subsystem in the learning mode, wherein an amount of power provided from the power supply unit to the information handling subsystem is reduced by the amount of power provided from the battery based on the learning mode current limit and the learning mode voltage level, wherein the battery provides power to the information handling subsystem concurrently with the power supply unit in the learning mode; and
determining that the battery has been discharged to an acceptable discharge level.

19. The non-transitory computer-readable medium of claim 18, further comprising:
in response to determining that the battery has been discharged to the acceptable discharge level, entering a charging mode of the battery power subsystem.

* * * * *